May 26, 1964  C. W. KINSMAN  3,134,195
HYDROCULTURE PAN COMBINATION
Filed Feb. 9, 1962
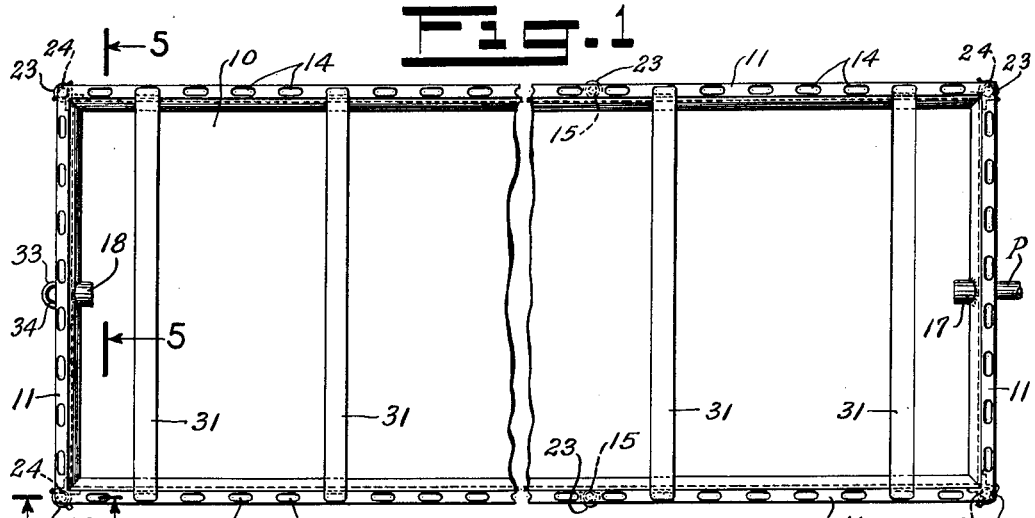
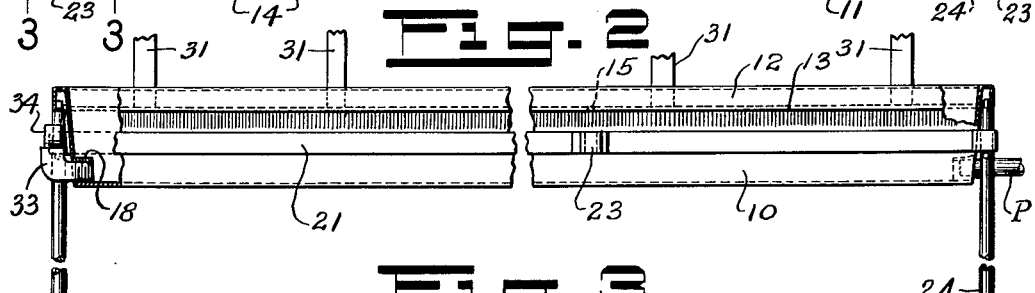
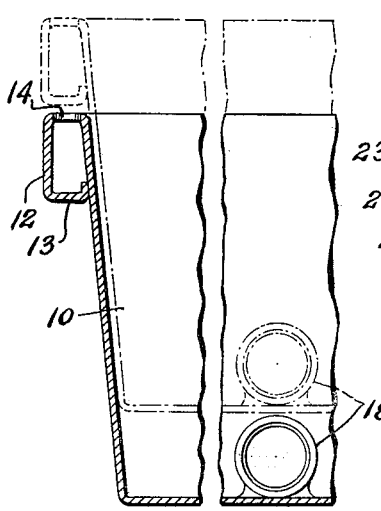
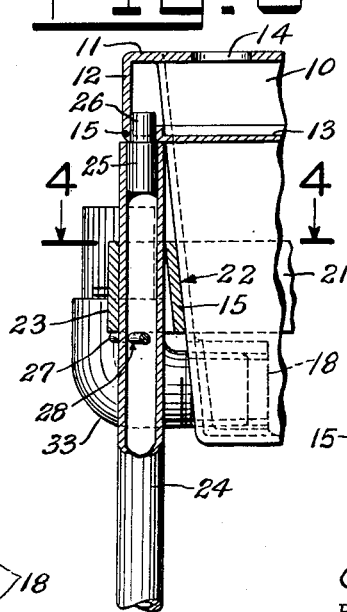
INVENTOR.
CLARENCE W. KINSMAN
BY John M. Montstream
ATTORNEY

United States Patent Office 3,134,195
Patented May 26, 1964

3,134,195
HYDROCULTURE PAN COMBINATION
Clarence W. Kinsman, 3143 E. Tremont Ave.,
Bronx 61, N.Y.
Filed Feb. 9, 1962, Ser. No. 172,289
10 Claims. (Cl. 47—1.2)

The invention relates to a hydroculture pan which is portable, can be nested together for compactness in shipping and storage and in addition it may be provided with easily mountable and dismountable legs. The pan is also constructed to receive a protective hood if and when desired.

It is an object of the invention to construct a hydroculture pan which can be nested together for minimum space in storage and transport and with easily mountable and dismountable legs.

Another object of the invention is to construct a hydroculture pan which is adapted to receive supporting rods for a hood or canopy if that should be desired.

Other objects of the invention will be more apparent from the following description when taken in connection with the accompanying drawings illustrating a preferred embodiment thereof in which:

FIG. 1 is a plan view of the pan;
FIG. 2 is a side view of the pan of FIG. 1;
FIG. 3 is an enlarged section of a removable leg construction taken on line 3—3 of FIG. 1;
FIG. 4 is a section taken on line 4—4 of FIG. 3;
FIG. 5 is a partial section of a pan showing the manner in which a second pan will nest therewith; and
FIG. 6 is a partial view of an outlet, a portion of which extends below the bottom level.

The pan 10 may be of any dimension and one having dimensions of about three feet by ten feet and about 9 inches deep is a desirable size for hydroculture purposes as well as for transportation and storage. The pan has downwardly and inwardly tapered sides so that they may be nested together for minimum space requirements for storage and shipment. Each pan preferably has an outwardly extending flange 11 at the top thereof on at least two opposite sides but for maximum convenience flanges are provided on all sides for reasons which will appear hereinafter. Preferably too each flange has a downwardly extending side flange 12 and the lower edge of the latter flange has an inwardly directed lower flange 13 spaced therefrom for example about two inches. The top flange has a series of spaced holes 14 therein, the purpose of which will be described hereinafter. Spaced holes 15 are provided in the lower flange as will appear. Each pan has a suitable inlet fitting for an inlet opening and connection and at one end thereof and an outlet fitting 18 for an outlet opening and connection preferably at the opposite end of the pan. Both the inlet and the outlet are shown at the bottom of the pan for drainage from the outlet and the outlet may be lower in the pan (FIG. 6) for more complete drainage. The inlet and outlet are remote from each other and particularly shown in opposite walls.

The pan is provided with leg means including easily mountable and removable legs. The leg means includes a suitable supporting means which engages the pan and shown as a band conforming in shape and size with the exterior sides of the pan at or above the outlet and inlet. The inner surfaces 22 are preferably tapered so that they will firmly engage the sides of the pan anywhere between the bottom and the top. Better support for the legs is secured if the band is at or adjacent to the bottom. A leg socket 23 is carried by the band in the region of each corner and is secured to the band such as by brazing or welding or it may be integral therewith. A leg 24 is insertable through the socket. The upper end of the leg is shaped or constructed to be received in the hole 15 in the lower flange 13 of the pan and the flange thus rests on the leg. An inexpensive leg is a pipe. The upper end of the leg may be constructed in several ways, that shown including a plug 25 which is received in the end of the pipe and suitably anchored thereto such as by welding. The plug has a nub 26 of a size to be received in the hole 15. The leg has then double support at the upper end and at the socket 23. A pin 27 may be projected through a pin hole 28 in the leg below the band 21 in order to assure that the band will not accidentally slip down. The inlet and outlet coupling or pipe could serve the same purpose as the pin 27 as shown in FIG. 6. Similar leg sockets and legs may be provided between the corners for large pans. The plug and the hole 15 constitute interengaging means carried by the top of the leg and a flange of the pan to retain the leg in position and to support the pan.

The hydroculture pans may be used in a suitable building or they may be used outdoors. When used outdoors there may be occasions when it would be desirable to cover the pans against cold or winds in which event two or more canopy bars 31 of generally U-shaped form may be inserted in the holes 14 in the top flange 11 of the pan and their ends abut the lower flange so that the canopy bars are supported in vertical position. These canopy bars may be flexible elements so that they are initially straight for compact shipping and storing and bent into U-shaped form when in use. A canopy of transparent or translucent plastic may then be mounted over the canopy bars in order to protect the growing plants from cold and winds and to form a sort of individual greenhouse for each pan. It is clear that adjacent pans may have a single canopy enclosing a plurality of pans. The pans may be used without the legs and placed on the floor of a building or on the ground in which event legs and a leg band are not provided.

In use the pans are connected at the inlet port with a source of fluid supply which may be merely water in which event the nutrient is supplied directly to the pans. The inlet or inlet fitting 17 may be connected with a source of fluid nutrient such as by a pipe P. The outlet of one pan may be connected with the inlet of an adjacent pan and this second pan may be similarly connected with a third and so forth connecting a plurality of pans in series. Alternatively the outlet or outlet fitting 18 of each pan may have an elbow coupling 33, FIG. 2, which is rotatable in the outlet fitting and the coupling carries a short length of outlet pipe 34 so that the angle of the outlet pipe may be changed and thereby control the level of water or nutrient fluid in a pan or a series of pans. The pans are loaded in any desirable fashion with gravel or the like over which there may be a porous mat, screen or layer of sand or combinations thereof to support the seeds and the growing plants. Wicks may also be used. A simple method for more certain drainage would be to tilt the pan towards the outlet fitting, or an inclined drainage bottom may be provided.

The angle of taper of the sides of the pans is such that maximum nesting of the pans is secured, one inside of another so that the storage space and the crating or shipping size would be minimal. The pan should be non-toxic that is the material is non-toxic or a material which is toxic may be plated or coated with non-toxic material. Magnesium is one such non-toxic material or metal and a magnesium pan has the further advantage that it is a very light metal.

The pans may be made in any known way such as by casting or pressing from sheet material. If cast the flanges may be cast flat and later bent into the form illustrated.

For shipping purpose the removable leg band and legs enable these parts to be separated and crated in small dimension for transportation and storage.

This invention is presented to fill a need for improvements in a hydroculture pan combination. It is understood that various modifications in structure, as well as changes in mode of operation, assembly, and manner of use, may and often do occur to those skilled in the art, especially after benfiting from the teachings of an invention. This disclosure illustrates the preferred means of embodying the invention in useful form.

What is claimed is:

1. A pan combination for hydroculture purposes comprising a pan having a top and four sides and a bottom, the sides tapering inwardly towards the bottom at an angle enabling nesting of one pan within another, an inlet fitting carried by one side wall at the bottom thereof and being entirely inwardly of the side wall, an outlet fitting carried by a side wall and remote from the inlet fitting and at the bottom of the side wall and being entirely inwardly of the side wall, flange means at the top of at least opposite sides of the pan extending outwardly, leg means including an insertable band encircling the outer four sides of the pan and engaging the same, a leg socket carried by the band at least in the region of each corner, a leg received in each socket and extending to the flange, and interengaging means carried by the upper end of the leg and the flange means to retain the leg in position.

2. A pan combination for hydroculture purposes comprising a pan having a top and four sides and a bottom, the sides tapering inwardly towards the bottom at an angle enabling nesting of one pan within another, an inlet fitting carried by one side wall, an outlet fitting carried by a side wall and remote from the inlet fitting and at the bottom of the side wall, a flange at the top of at least opposite sides of the pan extending outwardly and having a plurality of holes therein, and canopy bars received in the holes and extending over said pan.

3. A pan combination as in claim 2 in which the canopy bars are normally straight and bendable for use.

4. A pan combination as in claim 1 in which the flange is a top flange and having an outer edge, including a side flange extending downwardly from the outer edge of the top flange and having a lower edge, and a lower flange extending inwardly from the lower edge of the side flange, the interengaging means being carried by the lower flange, the upper flange having a plurality of spaced holes therein, and canopy bars received in the holes and extending over at least one pan.

5. A pan combination as in claim 1 including an outlet pipe extending upwardly from the outlet fitting and having its upper end located below the flange, and the outlet pipe being rotatable in the outlet fitting to adjust the liquid level in the pan.

6. A pan combination as in claim 1 in which the pan is made of magnesium.

7. A pan combination for hydroculture purposes comprising a pan having a top and four sides and a bottom, the sides tapering downwardly and inwardly toward the bottom at an angle enabling substantial nesting of one pan within another, an inlet fitting carried by one side at the bottom thereof, and projecting entirely inwardly from the side wall, an outlet fitting carried by the opposite side wall at the bottom thereof and projecting entirely inwardly from the side wall, the inlet and outlet fittings being opposite each other, flange means at the top of at least opposite sides of the pan extending outwardly, leg means including an insertable band encircling the outer four sides of the pan and engaging the same, a leg socket carried by the band at least in the region of each corner, and a leg received in each socket and extending to and engaging the flange means.

8. A pan combination as in claim 7 including interengaging means carried by the upper end of the leg and the flange means to positively retain the upper end of the leg in position.

9. A pan combination as in claim 7 in which the flange means includes an outwardly extending upper flange and a second flange outwardly of the pan and spaced below the upper flange, the upper flange having a plurality of spaced canopy holes therein, and canopy bars received in the canopy holes and engaging the second flange.

10. A pan combination as in claim 9 including a hole in the second flange in alinement with each leg socket to receive the end of the leg.

References Cited in the file of this patent

UNITED STATES PATENTS

| | | |
|---|---|---|
| 460,809 | Gunther | Oct. 6, 1891 |
| 1,045,816 | Coy | Dec. 3, 1912 |
| 2,649,102 | McDonough | Aug. 18, 1953 |
| 2,678,992 | Koch | May 18, 1954 |
| 2,891,352 | Altman | June 23, 1959 |